June 15, 1965

H. HACK 3,188,858

METHOD AND APPARATUS FOR DETERMINING
STATIC MOMENTS OF WORKPIECES

Filed July 5, 1961

3,188,858
METHOD AND APPARATUS FOR DETERMINING STATIC MOMENTS OF WORKPIECES
Heinrich Hack, Darmstadt, Germany, assignor to Carl Schenck Maschinenfabrik G.m.b.H., Darmstadt, Germany, a corporation of Germany
Filed July 5, 1961, Ser. No. 121,911
Claims priority, application Germany, July 6, 1960, Sch 28,120
6 Claims. (Cl. 73—65)

My invention relates to methods and means for measuring or checking the static moment of machine parts and other workpieces that, in ultimate use, are to rotate about a given axis of rotation and, in some cases, in fixed eccentrical relation to that axis. For example, individual turbine blades or buckets to be secured to a disc or wheel may have to be selected in accordance with their static moments before they are fixedly joined with the wheel structure or disc, in order to obtain a balanced blade wheel.

The static moment of a workpiece, this moment being proportional to the product of weight times radial spacing of its mass center from the axis of rotation, can be measured with the aid of a dynamic balancing machine. To prevent measuring errors beyond permissible tolerance limits, such measuring must be done with proper consideration of the ultimate mounting radius of the workpiece on the completed rotating machine structure. For that reason, the holding device or chuck for the workpiece in the known testing machines of this kind is so designed as to permit varying the radial spacing of the workpiece from the axis of rotation to take care of different mounting radii in the finished machinery of which the workpiece is to form part. Such mounting devices in testing machines occupy relatively much space and are rather expensive. They also require considerable weight for workpiece-clamping purposes and thereby impair the sensitivity of the testing apparatus.

It is an object of my invention to greatly minimize or virtually eliminate the above-mentioned disadvantages and to devise simple yet universally applicable methods and means for measuring or checking static moments of the above-mentioned type at high precision.

To this end, and in accordance with a feature of my invention, I employ the principle of measuring the static moment of a workpiece as the sum of a plurality of individual component moments of the workpiece during rotation of the workpiece in an eccentric or otherwise fixed relation to the axis of rotation, and I further translate the vibrations occurring during such rotation into electric magnitudes correlated to the respective component moments, and I electrically add these magnitudes in order to obtain a resultant electric value proportional to the static moment of the workpiece to be determined. According to a more specific and preferred feature of my invention, the just-mentioned method is performed relative to only two individual component static moments which jointly result in the total static moment of the workpiece. According to still another feature of my invention, the ultimate mounting radius of the workpiece is taken into account by means of an electric current or voltage adjustment easily performed with the aid of a resistor or potentiometer, for example.

According to a further feature of my invention, an apparatus for performing the above-described method comprises a mechanical portion and an electrical portion as follows. The mechanical portion is provided with an inherently balanced support journalled within oscillatingly mounted journal means, and provided on the support with clamping means, chucks or other attaching devices for mounting the workpiece as well as two counterpoises upon the support. When the workpiece and the two counterpoises are attached, the arrangement is such that the gravity centers of two component masses of the workpiece and the two gravity centers of the respective counterpoises determine two coordinate directions ($v$ and $h$) which intersects a main inertia axis ($x$—$x$) of the workpiece.

According to another, more specific feature of my invention, the above-mentioned rotatable workpiece support of a testing machine is mounted on a spindle which is revolvably journalled in a bridge structure that is connected with the machine frame by springs so as to be capable of oscillating along a given axis of oscillation transverse to the axis of rotation. The oscillating bridge structure of the machine is connected with an electric oscillation pickup or transducer, whereas the lower end of the spindle is connected, preferably through a Cardanic or other universally flexible shaft to a phase-reference generator which provides two electric reference alternating voltages whose respective phase positions coincide with the above-mentioned coordinate directions $v$ and $h$.

The electrical portion of the apparatus comprises the above-mentioned oscillation transducer as well as the phase reference generator. According to another, more specific feature of the invention, the oscillation pickup is provided with two mutually insulated coils in which respective alternating pickup voltages are generated. These two voltages are applied through adjustable potentiometers to two respective amplifiers, thus impressing upon these amplifiers two respective input voltages tapped off the potentiometers. However, one of the potentiometers comprises a series-connected resistance so that its voltage differs from that of the other by an amount that corresponds to the distance between the two gravity centers of the above-mentioned component masses of the workpiece. I further provide two electric multiplier devices, preferably of the Hall generator type, each having two input circuits and one output circuit to provide in the output circuit a resultant voltage proportional to the product of the respective voltages impressed upon the multiplier input circuits. One input circuit of each multiplier is connected to one of the respective amplifiers to receive amplified pickup voltage therefrom, whereas the other input circuit is connected with one of the respective voltage generating coils of the phase reference generator. The two output stages of the multiplier devices are serially connected with each other to measuring means whose indication is proportional to the sum of the two product voltages and, as will be more fully explained below, is proportional to the static moment to be measured or checked.

The invention will be further explained with reference to the drawings, showing by way of example an embodiment of static-moment measuring apparatus according to the invention.

Figure 1:
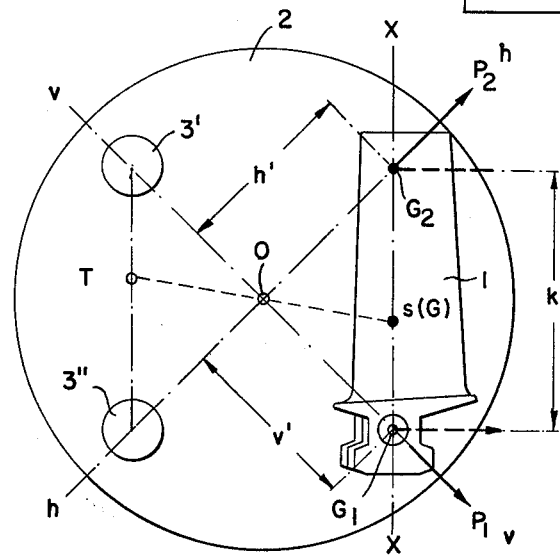
FIG. 1 is a schematic view of a disc-shaped workpiece support of the apparatus.
Figure 3:
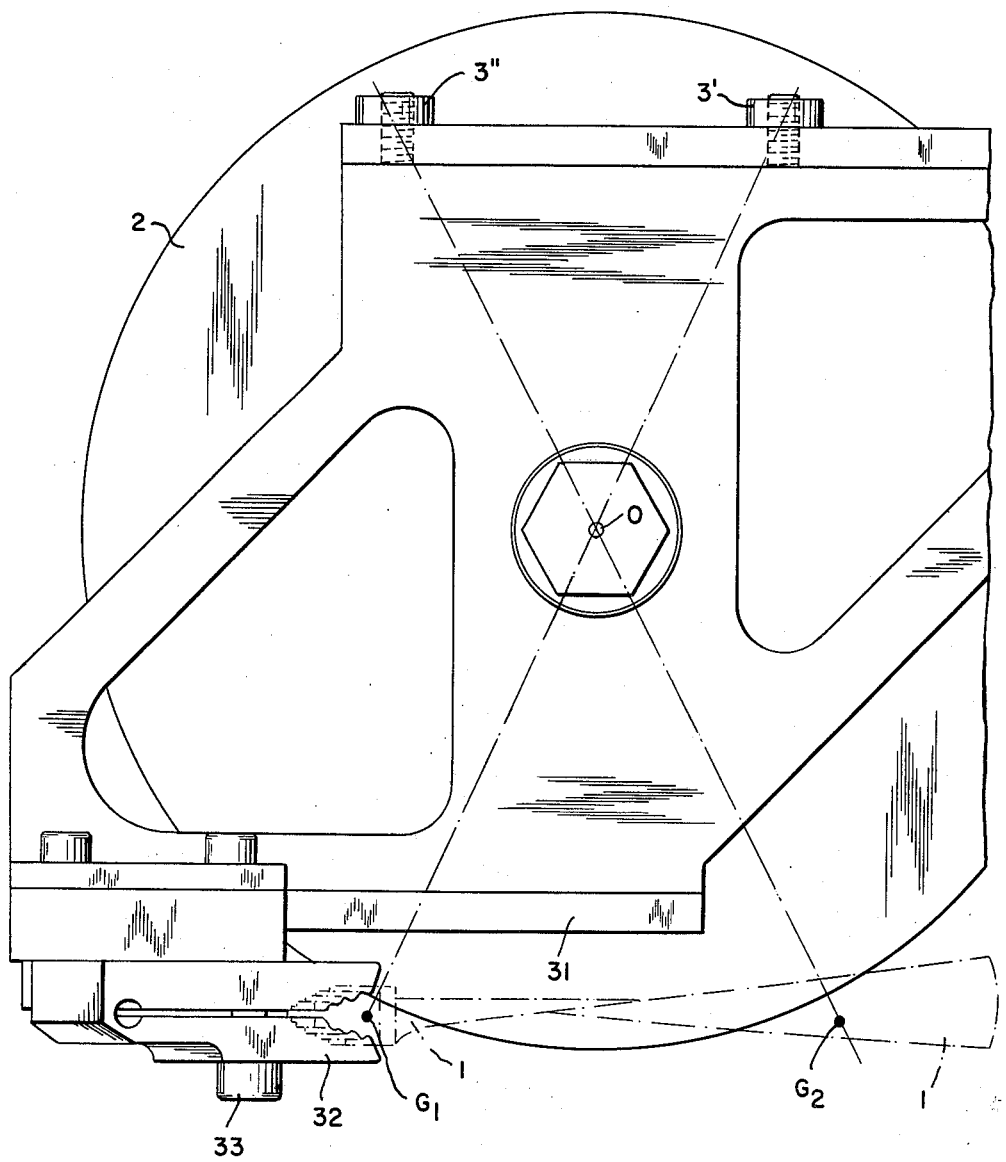

FIG. 3 is a top view similar to FIG. 1 but relating to a somewhat modified device and showing the mounting means on the workpiece support for attaching the workpiece and the counterpoises. In the illustrated machine, a workpiece 1, such as a turbine blade, is rigidly secured to a disc-shaped support 2. Also fastened to the support 2 are two counterpoises or master weights 3' and 3". As shown in FIG. 3, the support 2 carries a frame 31 to which a clamp 32 is secured for fastening the turbine blade 1 by means of a clamping bolt 33. The master weights 3' and 3" consist of units screwed onto bolts that are likewise secured to the frame 31.

Reverting to the diagram of FIG. 1, the mass (gravity) center of the entire workpiece is denoted by S. The entire mass, denoted by G can be analyzed as comprising two component masses located at the component mass centers $G_1$ and $G_2$ on a main inertia axis $x$—$x$ of the workpiece passing through the total-mass center S, the total mass G being equal to the sum of the two component masses: $G = G_1 + G_2$. The weight 3' serves as a counterpoise with respect to the partial mass $G_1$, and the weight 3" as a counterpoise with respect to partial mass $G_2$. Each of the two counter-weights is so arranged that the diametrical line passing through its gravity center and through the gravity center $G_1$ or $G_2$ of the corresponding component mass of the workpiece, determines one of two coordinate directions $v$, $h$. The two diametrical lines intersect the main inertia axis $x$—$x$ passing through the total-mass center of the workpiece. The center point of rotation of the supporting disc is denoted by 0. The leverage arms of the component masses $G_1$ and $G_2$ relative to the axis of rotation and passing through the center point 0, are designated by $v'$ and $h'$. Two arrows $P_1$ and $P_2$ signify the radial forces that occur in the coordinate directions $v$ and $h$ respectively, during rotation of the described assembly.

Figure 2:
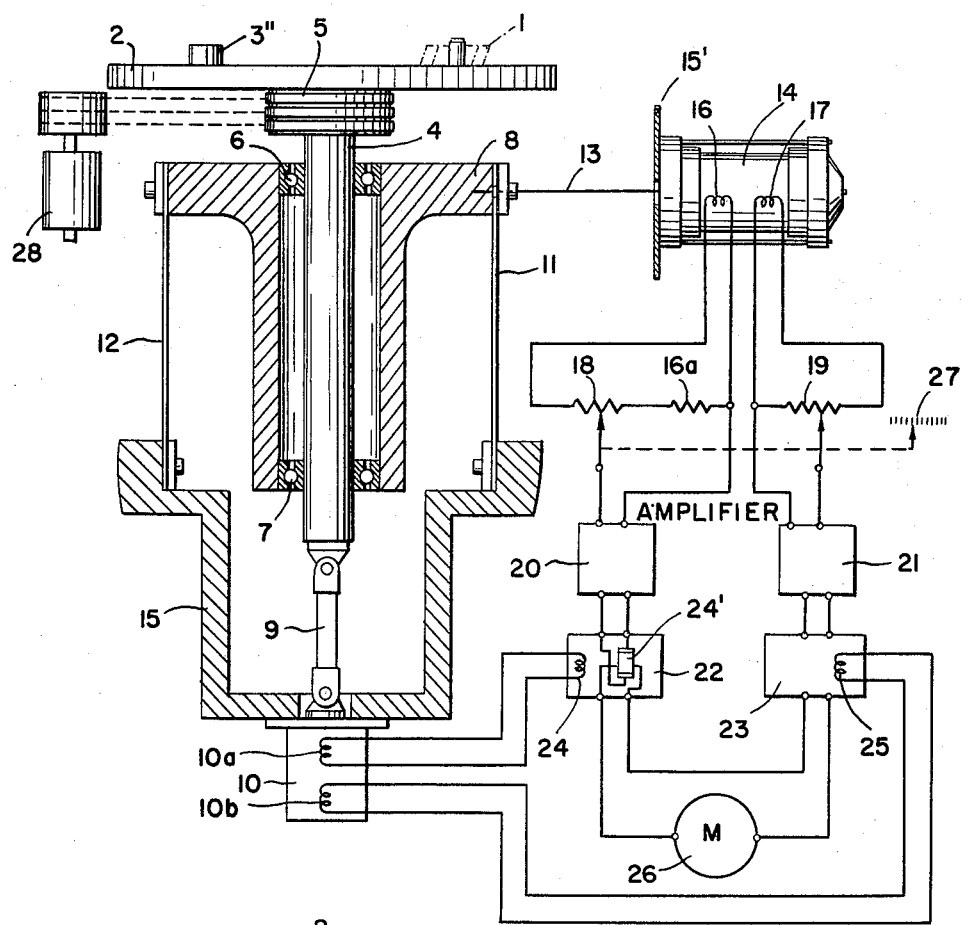
FIG. 2 is a lateral view of the entire mechanical portion of the apparatus, some parts shown in axial section, and also shows a schematic circuit diagram of the appertaining electric components.

The above-described supporting disc 2 with the workpiece and counterpoises mounted thereon is joined with a vertical spindle 4 on which V-belt sheaves 5 are mounted for driving the spindle and disc at the desired constant testing speed, for example by means of an electric motor schematically shown at 28. The spindle 4 is journalled in ball bearings 6 and 7 which are fastened in a bridge structure 8 oscillatingly secured to the machine frame 15 by means of leaf springs 11 and 12. The bridge structure 8 with the spindle journalled therein is thus capable of oscillating horizontally in the plane of illustration (FIG. 2). Any such horizontal oscillation, semming from unbalance forces of the group of bodies mounted in the above-described manner on the supporting disc 2, are transmitted by a feeler rod 13 to an electrodynamic oscillation pickup 14 whose housing is rigidly joined with a wall 15' of the rigid machine-frame structure 15.

Linked to the lower end of the spindle 4 is a Cardanic shaft 9 which is coupled with a phase reference generator 10 mounted on the frame structure 15 of the machine. Any device capable of furnishing a periodic output voltage proportional to the speed of rotation is suitable for use as a phase reference generator. In the embodiment according to FIGS. 1 and 2 the generator comprises two coils 10a and 10b for producing two sinusoidal voltages 90° phase-displaced from each other.

The pickup 14 is provided with two mutually insulated coils 16 and 17 in which two pickup voltages are generated under the effect of the above-mentioned unbalance-responsive oscillations of the journalling bridge 8. The voltages generated by the coils 16 and 17 are supplied through respective resistance potentiometers 18 and 19 to the input terminals of respective amplifiers 20 and 21. Each potentiometer has a displaceable tap. The two tap contacts are mechanically or otherwise joined with each other so that they can be adjusted simultaneously in fixed relation to each other. The selected tap adjustment is indicated on a scale of indicia denoted by 27. Relative to the input circuit of amplifier 20, the tapped off portion of potentiometer 18 is connected in series with a resistor 16a of constant resistance which corresponds to the distance $k$ (FIG. 1) between the gravity centers of the component masses $G_1$ and $G_2$ of the workpiece.

The measuring apparatus further comprises two electric multiplying devices generally of the wattmetric type. It is preferable to use multiplying semiconductor devices of the Hall generator type such as schematically shown in FIG. 2. Each of the multiplying devices 22, 23 comprises a magnetic field winding 24 or 25. Located in the field of each winding is a Hall plate 24' consisting of a semiconductor wafer, for example of indium arsenide or indicum antimonide. The wafer is of generally rectangular shape and has two current supply terminals along the respective two narrow sides and two probe electrodes (Hall electrodes) located at the respective long side of the rectangle midway between the two current supply terminals. The above-described magneting coil 24 or 25 constitutes one input circuit of the multiplier, and the output circuit of the amplifier 20 or 21 constitutes the other input circuit. The output circuit of each multiplier is connected to the two Hall electrodes which furnish a voltage proportional to the mathematical product of the two voltages in the respective input circuits. The two multiplier output circuits are joined with each other and serially connected to measuring means here illustrated simply by an indicating measuring instrument 26 although any other type of circuit for measuring, indicating, recording or controlling purposes may also be used.

The voltages generated in the coils 16 and 17, due to any discrepancy between the moment resulting from the counterpoises 3', 3" and that resulting from the workpiece, are applied to the amplifiers 20 and 21 through the jointly adjustable potentiometers 18 and 19 respectively. The tapped-off and amplified voltages are multiplied in the two Hall generators 22 and 23 with the respective sine and cosine currents of the phase reference generator 10. The products of these two product voltages are additively supplied to the measuring instrument 26.

For further explaining the invention, reference will be made to FIG. 1. Assume that the moment of the workpiece 1 has the desired value as defined by the product of the eccentric workpiece mass times the radial spacing of its mass center S from the axis of rotation, and that this moment is fully compensated by the two compensating masses of the respective counterpoises 3' and 3". Under these conditions, the mass center S of the workpiece and the resultant mass center T of both compensating masses lie on a diameter T–O–S through the center of rotation O, and the compensating mass center T subdivides the distance between the individual mass centers of the two master weights 3', 3" in the same ratio as the mass center S divides the distance $G_1$–$G_2$ on the workpiece axis $x$—$x$. It will be noted that the workpiece can thus be looked upon as having two component masses, namely one ($G_1$) at the foot of the turbine blade and one ($G_2$) in the head or tip portion of the blade, these two component masses being located on opposite sides of the mass-center diameter T–O–G.

When such a compensated assembly is rotated, no unbalance vibrations of the support 2 occur, and the measuring instrument 26 (FIG. 2) shows zero.

Now assume that the workpiece does not have the correct moment as defined by the resultant moment of the master weights 3', 3". Then the resulting unbalance will cause the rotating support to vibrate, and the instrument 26 shows a positive or negative deflection from zero indicative of the error moment by which the workpiece departs from the desired value. Although the distance of the workpiece mass center S from the rotational center O of the support is not, or not necessarily, equal to the corresponding distance of the workpiece from the rotor axis after the workpiece is assembled, for example as part of a turbine rotor, the insertion of the resistor 16a into one of the circuits permits adjusting the resulting electric output by a factor that takes the difference into account. Consequently, the circuit can be set to indicate the error moments in terms of the ultimate rotor moments of the workpieces. The measuring device can be calibrated for direct indication in any desired unit values.

The invention is particularly advantageous in cases where the static moments of a large number of workpieces, all of the same kind and size, are to be determined or checked. For this purpose, the method is preferably performed by first selecting from a large number of workpieces a specimen whose accuracy with respect to shape exhibits an optimum. This specimen, taken as a "standard" is mounted on the dynamic machine and balanced to zero by means of the master weights 3' and 3". When this step is completed, the measuring instrument will show zero. Thereafter the other workpieces are tested in the same manner, one at a time. The required measuring operation in this case is limited only to a determination of the magnitude by which the indicated result differs from zero in the plus or minus direction. In this manner, the workpieces can be sorted and grouped in accordance with accuracy of shape by means of a method that can be performed with particular ease and great rapidity.

It will be obvious to those skilled in the art, upon studying this disclosure, that with respect to design details a testing apparatus according to my invention can be modified in various ways and hence can be given an embodiment other than particularly illustrated and described herein without departing from the essential features of my invention and within the scope of the claims annexed hereto.

I claim:

1. The method of testing workpieces, constituting substantially uniform eccentric components of a rotor, as to their respective moments defined by the product of the mass of an individual workpiece times the distance of its mass center from the rotor axis, which comprises firmly attaching a workpiece on a rotatable support and compensating the desired value of workpiece moment by attaching to the same support two compensating masses with their mass centers on respective radii spaced a given angle from each other, the compensating masses having a resultant compensating mass center located on a radial line passing substantially through said mass center of said workpiece, rotating the support with the attached workpiece and compensating masses at constant speed, sensing in one plane the oscillations of said rotating support relative to two component directions correlated to those of said respective radii, translating the sensed oscillations into respective component electric magnitudes, generating a reference voltage denoting angular displacement of the rotating support and multiplying said component electric magnitudes respectively with said reference voltage and adding the product of said component magnitudes respectively and said reference voltage to obtain a resultant magnitude indicative of any departure of the actual workpiece moment from the desired value.

2. The method of testing workpieces, constituting eccentric units of a rotor, as to their respective moments defined by the product of the mass of an individual workpiece times the distance of its mass center from the rotor axis, which comprises firmly attaching a workpiece on a rotatable support in eccentric relation to the rotational axis of the support and compensating the desired value of the workpiece moment by attaching to the same support two compensating masses with their mass centers on respective radii spaced a given angle from each other, the compensating masses having a resultant compensating mass center located diametrically opposite said mass center of said workpiece, rotating the support with the attached workpiece and compensating masses at constant speed, sensing in one plane the oscillations of said rotating support relative to two component directions correlated to those of said respective radii, translating the sensed oscillations into respective component electric magnitudes, generating a reference voltage denoting angular displacement of the rotating support and multiplying said component electric magnitudes respectively with said reference voltage and adding the product of said component magnitudes respectively and said reference voltage to obtain a resultant magnitude indicative of any departure of the workpiece moment from the desired value.

3. The method of testing workpieces according to claim 1, which comprises first performing the method with a standard workpiece, zeroing the measured electric quantity relative to a measuring instrument, thereafter substituting the standard workpiece successively by other workpieces of the same kind whereby the departure of the instrument indication from the zero value is indicative each time of the discrepancy of the moment of the respective other workpieces from that of the standard workpiece.

4. Apparatus for testing workpieces, constituting eccentric structural units of a rotor, as to their respective moments defined by the product of the mass of an individual workpiece times the distance of its mass center from the rotor axis, comprising oscillatingly mounted journal means, a support rotatable in said journal means, said support being adapted for mounting a workpiece in eccentric mass relation to the axis of rotation, two counterpoises eccentrically mounted on said support for jointly compensating the desired value of the workpiece moment, said two counterpoises having respective mass centers on two radii spaced a given angle from each other and having a common mass center substantially opposite diametrically to that of the workpiece when the latter is mounted on said support, means for imparting rotation of constant speed to said support, means for constraining said support to vibrate in one plane when excited by the rotation of said support, an oscillation pickup for providing pickup voltage responsive to vibration of said support in said one plane, a reference voltage generator controlled in synchronism with said support rotation and having two reference voltages phase-displaced from each other in accordance with the angle between said two radii, two electric multiplier devices each having two input circuits connected to said pickup voltage and to one of said respective reference voltages, each of said devices having an output circuit whose output voltage is proportional to the product of the voltages in the two input circuits respectively, and measuring means to which said two output circuits are connected in additive relation of said two output voltages, whereby the response of said measuring means is indicative of the departure of the workpiece moment from the desired value.

5. In testing apparatus according to claim 4, said pickup comprising two circuits for providing two pickup voltages, two potentiometers connected across said two pickup circuits respectively and having each an adjustable tap connected with one of said respective multiplier devices to furnish thereto an adjustably tapped-off input voltage, and a fixed resistor connected in series with one of said potentiometers for modifying the corresponding one input voltage in accordance with the ultimate mounting radius of the workpiece on the rotor.

6. Apparatus for testing workpieces, constituting eccentric units of a rotor, as to their respective moments defined by the product of the mass of an individual workpiece times the distance of its mass center from the rotor axis, comprising oscillatingly mounted journal means, a support rotatable in said journal means, said support being adapted for mounting a workpiece in eccentric mass relation to the axis of rotation, two counterpoises eccentrically mounted on said support for jointly compensating the desired value of the workpiece moment and having respective mass centers on two radii angularly spaced 90° from each other, the common mass center of said two counterpoises being substantially opposite diametrically to that of the mounted workpiece, means for imparting rotation of constant speed to said support, means for constraining said support to vibrate in one plane when excited by the rotation of said support, an oscillation pickup of the electrodynamic type having two coils for generating two pickup voltages responsive to vibration of said support in said one plane, a reference-voltage generator controlled in synchronism with said support rotation and having two reference voltages 90° phase-displaced from each other, two resistance potentiometers connected to said respective pickup coils and having each an adjustable tap, two wattmetric multiplier devices each having two input circuits connected to one of said respective taps and to one of said two respective reference voltages, each of said multiplier devices having an output voltage proportional to the product of the voltages of its two input circuits, and a fixed resistor connected in series with one of said potentiometers for modifying the corresponding one input voltage in accordance with the ultimate mounting radius of the workpiece on the rotor of which the workpiece is to form part, and measuring means connected to said two output voltages to furnish a measuring result indicative of the departure of the workpiece moment from the desired value.

References Cited by the Examiner
UNITED STATES PATENTS

| | | | |
|---|---|---|---|
| 2,872,819 | 2/59 | King | 73—462 |
| 2,891,241 | 6/59 | Fibikar | 73—462 |
| 2,926,529 | 3/60 | Hook et al | 73—456 |

FOREIGN PATENTS 1,213,160  10/59  France.

RICHARD C. QUEISSER, *Primary Examiner*.
JOSEPH P. STRIZAK, *Examiner*.